(12) United States Patent
Zhu

(10) Patent No.: US 12,501,505 B2
(45) Date of Patent: Dec. 16, 2025

(54) RADIO LINK MONITORING AND RECOVERY METHOD, APPARATUS, AND DEVICE, AND MEDIUM

(71) Applicant: Beijing Xiaomi Mobile Software Co., Ltd., Beijing (CN)

(72) Inventor: Yajun Zhu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 369 days.

(21) Appl. No.: 18/005,718

(22) PCT Filed: Aug. 6, 2020

(86) PCT No.: PCT/CN2020/107456
§ 371 (c)(1),
(2) Date: Jan. 17, 2023

(87) PCT Pub. No.: WO2022/027458
PCT Pub. Date: Feb. 10, 2022

(65) Prior Publication Data
US 2023/0284313 A1    Sep. 7, 2023

(51) Int. Cl.
*H04W 76/19* (2018.01)
*H04L 5/00* (2006.01)
*H04W 72/12* (2023.01)
*H04W 72/232* (2023.01)
*H04W 74/0833* (2024.01)

(52) U.S. Cl.
CPC ........... *H04W 76/19* (2018.02); *H04L 5/0053* (2013.01); *H04W 72/12* (2013.01); *H04W 72/232* (2023.01); *H04W 74/0833* (2013.01)

(58) Field of Classification Search
None
See application file for complete search history.

(56) References Cited

U.S. PATENT DOCUMENTS

2012/0213058 A1*  8/2012  Duan ............... H04W 74/0833
                                                          370/221
2020/0068617 A1*  2/2020  Yoon ................ H04W 74/006
(Continued)

FOREIGN PATENT DOCUMENTS

CN      110149177 A     8/2019
CN      110351875 A    10/2019

OTHER PUBLICATIONS

Author Unknown, Summary of email discussion [Post109bis-e][921][NR15] CRs for FR2 CA Fallback (Apple), pp. 1-7, Jun. 12, 2020.*

(Continued)

*Primary Examiner* — Christopher M Crutchfield
(74) *Attorney, Agent, or Firm* — Finnegan, Henderson, Farabow, Garrett & Dunner, L.L.P.

(57) ABSTRACT

A method for radio link monitoring and recovery is performed by a terminal, and includes: sending a random access preamble on a fallback random access chancel resource in response to a radio link failure occurring in a secondary cell; and receiving a first physical downlink control channel (PDCCH) sent on a fallback control resource (CORESET) resource, wherein the first PDCCH is configured to schedule a data channel on one of a primary cell, a primary secondary cell, the secondary cell, or another secondary cell.

15 Claims, 3 Drawing Sheets

(56) References Cited

U.S. PATENT DOCUMENTS

| | | | |
|---|---|---|---|
| 2021/0068162 A1* | 3/2021 | Agiwal | H04L 5/0048 |
| 2022/0039116 A1* | 2/2022 | Takeda | H04W 72/1263 |
| 2023/0036466 A1* | 2/2023 | Yoshioka | H04L 5/001 |
| 2023/0085896 A1* | 3/2023 | Takeda | H04W 72/23 370/329 |

OTHER PUBLICATIONS

International Search Report and Written Opinion of International Application No. PCT/CN2020/107456, mailed Apr. 25, 2021, 15 pages.

The First Office Action issued by the State Intellectual Property Office of People's Republic of China on Jan. 9, 2025, in corresponding Application No. CN 202080001844.1, 17 pages.

"Discussions on beam failure recovery for CA", CATT, Huawei, HiSilicon, 3GPP TSG-RAN WG2 Meeting #101, R2-1802490, Athens, Greece, Feb. 26-Mar. 3, 2018, 2 pages.

"Discussion on beam failure recovery for SCell", Huawei, HiSilicon, 3GPP TSG-RAN WG2 Meeting 102, R2-1807975, Busan, Korea, May 21-25, 2018, 9 pages.

* cited by examiner

RADIO LINK MONITORING AND RECOVERY METHOD, APPARATUS, AND DEVICE, AND MEDIUM

CROSS-REFERENCE TO RELATED APPLICATION

This application is a U.S. national phase of International Application No. PCT/CN2020/107456, filed on Aug. 6, 2020, the entire content of which is incorporated herein by reference.

FIELD

The present disclosure relates to the field of wireless communication, in particular to a method for radio link monitoring and recovery, an apparatus, a device and a medium.

BACKGROUND

New radio (NR) supports dual connection and/or carrier aggregation scenarios.

In the dual connection and/or carrier aggregation scenarios, the primary cell (PCell) or the primary secondary cell (PSCell) can perform cross-carrier scheduling on the secondary cell (SCell).

SUMMARY

Embodiments of the present disclosure provide a method for radio link monitoring and recovery, an apparatus, a device and a storage medium.

According to an aspect of the present disclosure, a method for radio link monitoring and recovery is provided, and the method includes:
- sending, by a terminal, a random access preamble on a fallback physical random access chancel (PRACH) resource of a primary cell or a primary secondary cell in response to a radio link failure occurring in a secondary cell scheduling the primary cell or the primary secondary cell; and
- receiving, by the terminal, a first physical downlink control channel, PDCCH, sent on a fallback control resource set, CORESET, resource of the primary cell or the primary secondary cell, in which the first PDCCH is configured to schedule a data channel on the primary cell, the primary secondary cell, the secondary cell, or another secondary cell.

According to an aspect of the present disclosure, a method for radio link monitoring and recovery is provided, and the method includes:
- receiving, by a network device, a random access preamble sent by a terminal on a fallback random access chancel resource of a primary cell or a primary secondary cell, in which the random access preamble is sent in response to a radio link failure occurring in a secondary cell; and
- sending a first physical downlink control channel, PDCCH, to the terminal on a fallback control resource set, CORESET, resource of the primary cell or the primary secondary cell, in which the first PDCCH is configured to schedule a data channel on the primary cell, the primary secondary cell, the secondary cell, or another secondary cell.

According to an aspect of the present disclosure, a terminal is provided, and the terminal includes: a processor; a transceiver connected with the processor; and a memory for storing executable instructions of the processor. The processor is configured to load and execute the executable instructions to implement the method for radio link monitoring and recovery according to the above aspect.

According to an aspect of the present disclosure, a network device is provided, and the network device includes: a processor; a transceiver connected with the processor; and a memory for storing executable instructions of the processor. The processor is configured to load and execute the executable instructions to implement the method for radio link monitoring and recovery according to the above aspect.

According to an aspect of the present disclosure, a computer readable storage medium having executable instructions stored thereon is provided. The executable instructions are loaded and executed by a processor to implement the method for radio link monitoring and recovery according to the above aspect.

According to an aspect of the present disclosure, a computer program product having executable instructions stored thereon is provided. The executable instructions are loaded and executed by a processor to implement the method for radio link monitoring and recovery according to the above aspect.

According to an aspect of the present disclosure, a chip is provided. The chip is configured to be executed to implement the method for radio link monitoring and recovery according to the above aspect.

BRIEF DESCRIPTION OF THE DRAWINGS

A brief description of drawings used in the embodiments is given below. Obviously, the drawings in the following descriptions are only uses to illustrate examples embodiments of the disclosure, and for those skilled in the art, other embodiments can be obtained.

DETAILED DESCRIPTION

Embodiments of the disclosure will be further described in detail with reference to the accompanying drawings.

Figure 1:
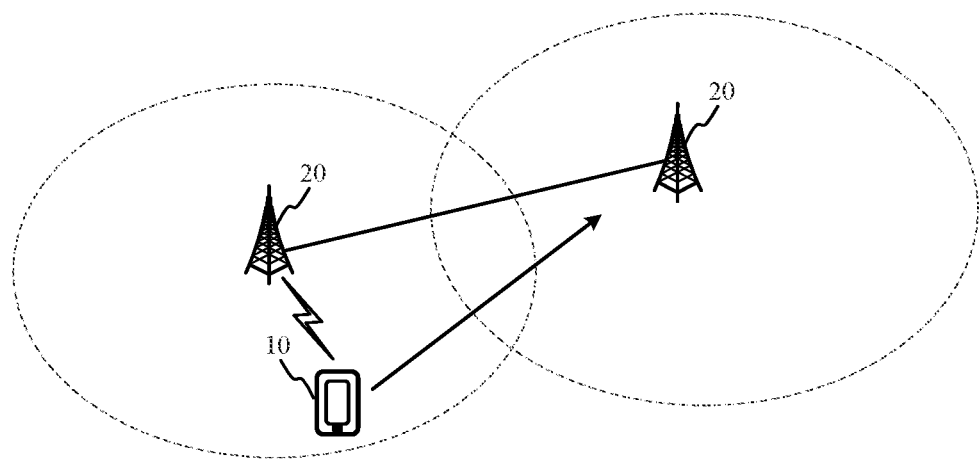
FIG. 1 is a schematic diagram illustrating a network structure of a communication system according to an exemplary embodiment.

FIG. 1 shows a schematic diagram illustrating a network structure of a communication system according to an exemplary embodiment. The communication system may include a terminal 10 and a network device 20.

The number of terminals 10 is usually multiple, and one or more terminals 10 can be distributed in a cell managed by each network device 20. The terminal 10 may include various handheld devices, on-board devices, wearable devices or computing devices that have wireless communication functions, or other processing devices connected to wireless modems, as well as various forms of user equipment (UE), mobile stations (MS), etc. For the convenience of description, in the embodiments of the disclosure, the devices mentioned above are collectively referred to as terminals.

The network device 20 is a device deployed in an access network to provide wireless communication functions for the terminal 10. The network device 20 may include various forms of macro base stations, micro base stations, relay stations, access points, and the like. In systems using different wireless access technologies, the names of devices with network device functions may be different. For example, in a 5G new radio (NR) system, the device is called gNodeB or gNB. With the evolution of communication technologies, the name "network equipment" may change. For the convenience of description, in the embodiments of the disclosure, the above devices that provide wireless communication functions for the terminal 10 are collectively referred to as network devices.

The "5G NR system" in the embodiments of the present disclosure can also be referred to as a 5G system or an NR system. The NR system can be a communication system supporting NR-U, or a non-terrestrial network (NTN). The technical solution described in the embodiments of the present disclosure can be applied to the 5G NR system, and can also be applied to the subsequent evolution system of the 5G NR system.

The present disclosure provides a method and an apparatus for radio link monitoring and recovery that are suitable for carrier aggregation scenarios. When the network device uses a secondary cell (SCell) to schedule a primary cell (PCell) or a primary secondary cell (PSCell) across carriers, the radio link failure of SCell can be quickly found, and the connection of the physical layer control channel between the network device and the terminal can be quickly recovered, which not only solves the problem of the physical downlink control channel (PDCCH) resource congestion on the PCell or the PSCell, but also ensures the reliability of the communication link.

Figure 2:
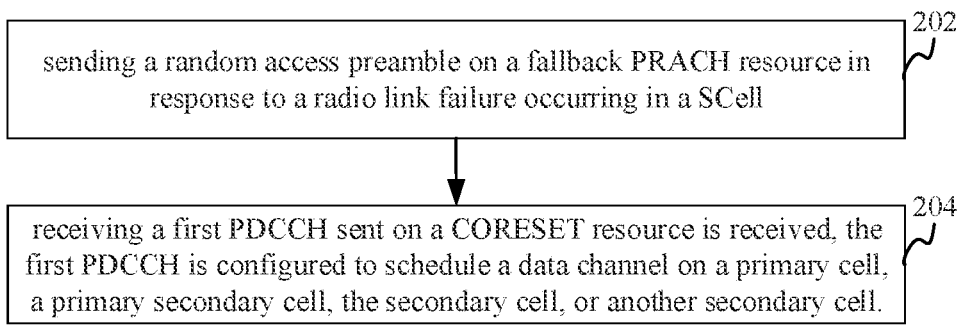
FIG. 2 is a flow chart of a method for radio link monitoring and recovery according to an exemplary embodiment.

FIG. 2 shows a flow chart of a method for radio link monitoring and recovery according to an exemplary embodiment. The method is performed by a terminal, and includes:

Step 202, a random access preamble is sent on a fallback physical random access chancel (PRACH) resource in response to a radio link failure occurring in a SCell.

The terminal conducts radio link monitoring (RLM) measurement on the SCell. When the RLM measurement result is that the SCell has a radio link failure (RLF), the terminal sends the random access preamble on the fallback PRACH resource.

Fallback random access channel resources, fallback control resource set (CORESET) resources and the random access preamble are resources on the PCell. Or, the fallback random access channel resources, the fallback CORESET resources and the random access preamble are resources on the PSCell.

Optionally, the secondary cell is used to schedule data transmission on the PCell or the PSCell.

Step 204, a first PDCCH sent on a CORESET resource is received, the first PDCCH is configured to schedule a data channel on a primary cell, a primary secondary cell, the secondary cell, or another secondary cell.

The data channel includes, but is not limited to, at least one of a physical downlink shared channel (PDSCH) and a physical uplink shared channel (PUSCH).

Optionally, the first PDCCH is used to schedule at least one of the PUSCH and the PDSCH on the PCell. Or, the first PDCCH is used to schedule at least one of the PUSCH and the PDSCH on the PSCell. Or, the first PDCCH is used to schedule at least one of the PUSCH and the PDSCH on SCell. Or, the first PDCCH is used to schedule at least one of the PDSCH and the PUSCH on other SCells.

In conclusion, with the method provided in the embodiments, the fallback PRACH resource, the fallback CORESET resource and the random access preamble are provided in a scenario where the SCell is used to schedule data transmission on the PCell or the PSCell, so that when the SCell has the radio link failure, the connection of the physical layer control channel between the network device and the terminal can be quickly recovered using the fallback CORESET resource, not only solving the problem of PDCCH resource congestion on the PCell or the PSCell, but also ensuring the reliability of the communication link.

Figure 3:
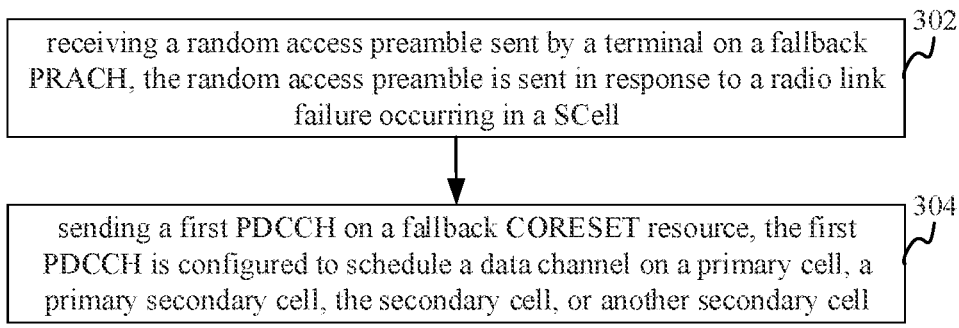
FIG. 3 is a flow chart of a method for radio link monitoring and recovery according to an exemplary embodiment.

FIG. 3 shows a flow chart of a method for radio link monitoring and recovery according to an exemplary embodiment. The method is performed by a network device, and includes:

Step 302, a random access preamble sent by a terminal is received on a fallback PRACH resource, the random access preamble is sent when a radio link failure occurs in a SCell.

The terminal conducts RLM measurement on the SCell. When the RLM measurement result is that the SCell has a RLF, the terminal sends the random access preamble on the fallback PRACH resource.

Fallback random access channel resources, fallback CORESET resources and the random access preamble are resources on the PCell. Or, the fallback random access channel resources, the fallback CORESET resources and the random access preamble are resources on the PSCell.

Optionally, the secondary cell is used to schedule data transmission on the PCell or the PSCell.

Step 304, a first PDCCH is sent on a fallback CORESET resource, the first PDCCH is configured to schedule a data channel on the primary cell, the primary secondary cell, the secondary cell, or another secondary cell.

The data channel includes, but is not limited to, at least one of a PDSCH and a PUSCH.

Optionally, the first PDCCH is used to schedule at least one of the PUSCH and the PDSCH on the PCell. Or, the first PDCCH is used to schedule at least one of the PUSCH and the PDSCH on the PSCell. Or, the first PDCCH is used to schedule at least one of the PUSCH and the PDSCH on SCell. Or, the first PDCCH is used to schedule at least one of the PDSCH and the PUSCH on other SCells.

In conclusion, with the method provided in the embodiments, the fallback PRACH resource, the fallback CORESET resource and the random access preamble are provided in a scenario where the SCell is used to schedule data transmission on the PCell or the PSCell, so that when the SCell has the radio link failure, the connection of the physical layer control channel between the network device and the terminal can be quickly recovered using the fallback CORESET resource, not only solving the problem of PDCCH resource congestion on the PCell or the PSCell, but also ensuring the reliability of the communication link.

Figure 4:
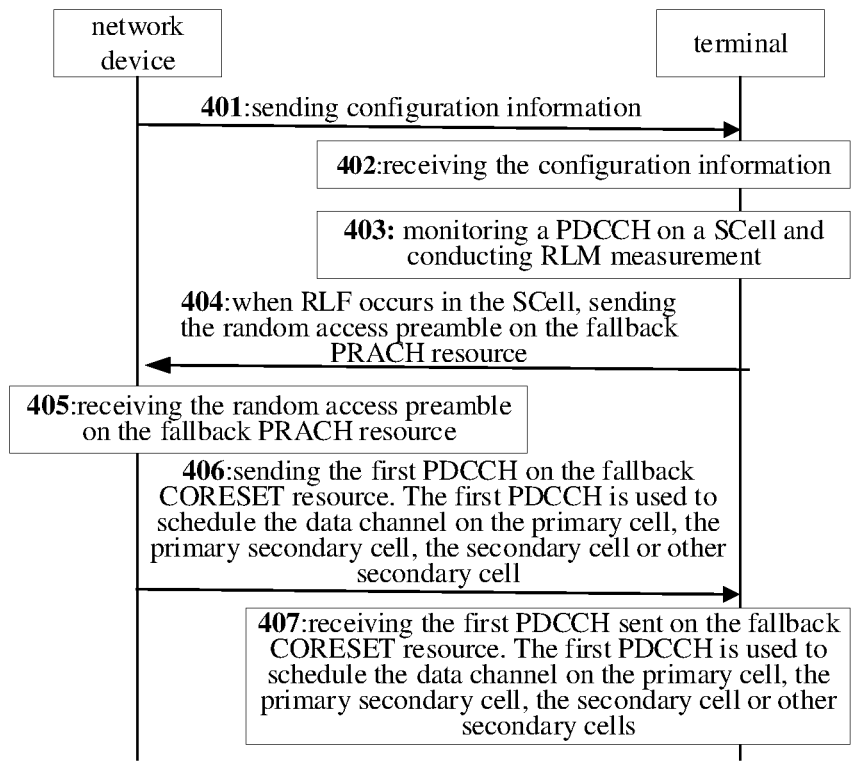
FIG. 4 is a flow chart of a method for radio link monitoring and recovery according to an exemplary embodiment.

FIG. 4 shows a flow chart of a method for radio link monitoring and recovery according to an exemplary embodiment. The method is performed by a network device and a terminal, and includes:

Step 401, the network device sends configuration information to the terminal, the configuration information is used to configure a fallback PRACH resource, a fallback CORESET resource and a random access preamble The configuration information is carried in high-level signaling or physical layer signaling. For example, the configuration information is carried in radio resource control (RRC) signaling.

Optionally, the configuration information includes first configuration information or second configuration information. The first configuration information is used to configure a fallback random access channel resource, a fallback CORESET resource and the random access preamble on a PCell. Or, the second configuration information is received, the second configuration information is used to configure a fallback random access channel resource, a fallback CORESET resource and a random access preamble on a PSCell.

Step 402, the terminal receives the configuration information of the network device.

Step 403, the terminal monitors a PDCCH on a SCell and conducts RLM measurement.

Optionally, the secondary cell is used to schedule data transmission on the PCell or the PSCell.

The network device sends the PDCCH on the SCell, the PDCCH is used to schedule data transmission on the PCell or the PSCell.

Step 404, when RLF occurs in the SCell, the terminal sends the random access preamble on the fallback PRACH resource.

The terminal conducts the RLM measurement on the SCell. When the RLM measurement result is that the SCell has RLF, the terminal sends the random access preamble on the fallback PRACH resource.

Step 405, the network device receives the random access preamble sent by the terminal on the fallback PRACH resource. The random access preamble is sent when the SCell has a radio link failure.

The network device receives the random access preamble sent by the terminal on the fallback PRACH resource.

The fallback random access channel resource, the fallback CORESET resource and the random access preamble are resources on the PCell. Or, the fallback random access channel resource, the fallback CORESET resource and the random access preamble are resources on the PSCell.

Optionally, the secondary cell is used to schedule data transmission on the PCell or the PSCell.

Step 406, the network device sends the first PDCCH on the fallback CORESET resource. The first PDCCH is used to schedule the data channel on the primary cell, the primary secondary cell, the secondary cell or other secondary cell.

The data channel includes, but is not limited to, at least one of PUSCH and PDSCH.

Optionally, the first PDCCH carries downlink control information (DCI), the DCI is used to schedule the data channel on the PCell or the PSCell. The data channel includes at least one of PUSCH and PDSCH.

Optionally, the first PDCCH is used to schedule at least one of the PUSCH and the PDSCH on the PCell. Or, the first PDCCH is used to schedule at least one of the PUSCH and the PDSCH on the PSCell. Or, the first PDCCH is used to schedule at least one of the PUSCH and the PDSCH on SCell. Or, the first PDCCH is used to schedule at least one of the PDSCH and the PUSCH on other SCells.

Step 407, the terminal receives the first PDCCH sent on the fallback CORESET resource. The first PDCCH is used to schedule the data channel on the primary cell, the primary secondary cell, the secondary cell or other secondary cells.

The terminal sends uplink data according to the data channel of the first PDCCH on the primary cell, the primary secondary cell, the secondary cell or other secondary cells, or receives downlink data in the data channel on the primary cell, the primary secondary cell, the secondary cell or other secondary cells.

In conclusion, with the method provided in the embodiments, the fallback PRACH resource, the fallback CORESET resource and the random access preamble are provided in a scenario where the SCell is used to schedule data transmission on the PCell or the PSCell, so that when the SCell has the radio link failure, the connection of the physical layer control channel between the network device and the terminal can be quickly recovered using the fallback CORESET resource, not only solving the problem of PDCCH resource congestion on the PCell or the PSCell, but also ensuring the reliability of the communication link.

Figure 5:
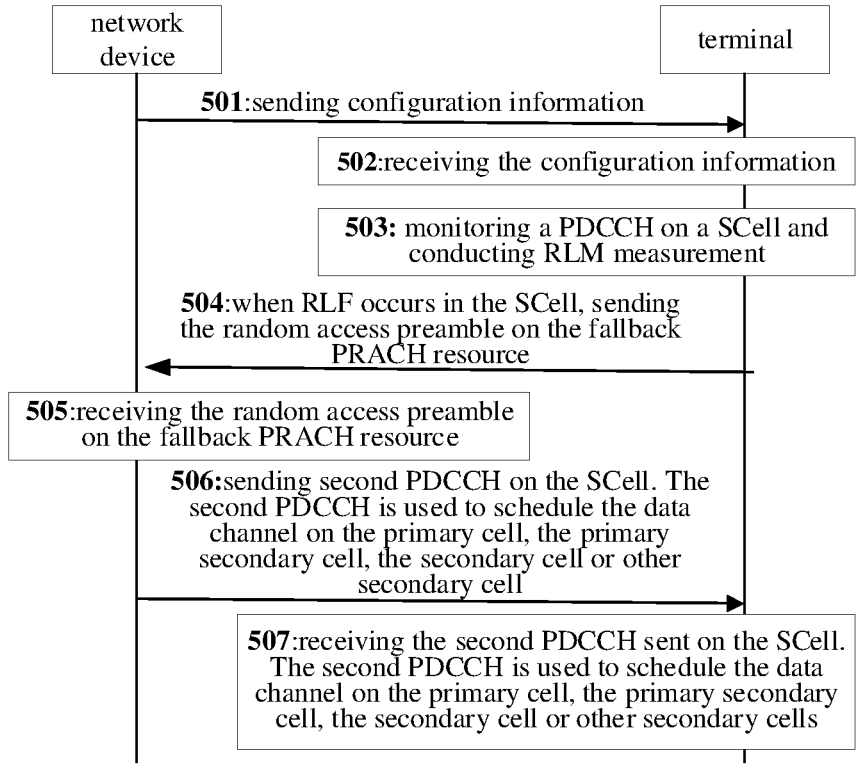
FIG. 5 is a flow chart of a method for radio link monitoring and recovery according to an exemplary embodiment.

FIG. 5 shows a flow chart of a method for radio link monitoring and recovery according to another exemplary embodiment. The method is performed by a network device and a terminal, and includes:

Step 501, the network device sends configuration information to the terminal, the configuration information is used to configure a fallback PRACH resource, a fallback CORESET resource and a random access preamble The configuration information is carried in high-level signaling or physical layer signaling. For example, the configuration information is carried in radio resource control (RRC) signaling.

Optionally, the configuration information includes first configuration information or second configuration information. The first configuration information is used to configure a fallback random access channel resource, a fallback CORESET resource and the random access preamble on a PCell. Or, the second configuration information is received, the second configuration information is used to configure a fallback random access channel resource, a fallback CORESET resource and a random access preamble on a PSCell.

Step 502, the terminal receives the configuration information of the network device.

Step 503, the terminal monitors a PDCCH on a SCell and conducts RLM measurement.

Optionally, the secondary cell is used to schedule data transmission on the PCell or the PSCell.

The network device sends the PDCCH on the SCell, the PDCCH is used to schedule data transmission on the PCell or the PSCell.

Step 504, when RLF occurs in the SCell, the terminal sends the random access preamble on the fallback PRACH resource.

The terminal conducts the RLM measurement on the SCell. When the RLM measurement result is that the SCell has RLF, the terminal sends the random access preamble on the fallback PRACH resource.

Optionally, the secondary cell is used to schedule data transmission on the PCell or the PSCell.

Step 505, the network device receives the random access preamble sent by the terminal on the fallback PRACH resource. The random access preamble is sent when the SCell has a radio link failure.

The network device receives the random access preamble sent by the terminal on the fallback PRACH resource.

The fallback random access channel resource, the fallback CORESET resource and the random access preamble are resources on the PCell. Or, the fallback random access channel resource, the fallback CORESET resource and the random access preamble are resources on the PSCell.

Optionally, the secondary cell is used to schedule data transmission on the PCell or the PSCell.

Step 506, the network device sends the second PDCCH on the SCell. The second PDCCH is used to schedule the data channel on the primary cell, the primary secondary cell, the secondary cell or other secondary cell.

The data channel includes, but is not limited to, at least one of PUSCH and PDSCH.

Optionally, the second PDCCH carries downlink control information (DCI), the DCI is used to schedule the data channel on the PCell or the PSCell. The data channel includes at least one of PUSCH and PDSCH.

Optionally, the second PDCCH is used to schedule at least one of the PUSCH and the PDSCH on the PCell. Or, the second PDCCH is used to schedule at least one of the PUSCH and the PDSCH on the PSCell. Or, the second PDCCH is used to schedule at least one of the PUSCH and the PDSCH on SCell. Or, the second PDCCH is used to schedule at least one of the PDSCH and the PUSCH on other SCells.

Step 507, the terminal receives the second PDCCH sent on the SCell. The second PDCCH is used to schedule the data channel on the primary cell, the primary secondary cell, the secondary cell or other secondary cells.

The terminal sends uplink data according to the data channel of the second PDCCH on the primary cell, the primary secondary cell, the secondary cell or other secondary cells, or receives downlink data in the data channel on the primary cell, the primary secondary cell, the secondary cell or other secondary cells.

In conclusion, with the method provided in the embodiments, in a scenario where the SCell is used to schedule data transmission on the PCell or the PSCell, when the SCell has the radio link failure, it remains on SCell to continue scheduling data transmission on the PCell or the PSCell, which can save the PDCCH resource on the PCell or the PSCell as much as possible.

The above embodiments of the method may be implemented individually or in combination, which is not limited in the present disclosure.

Figure 6:
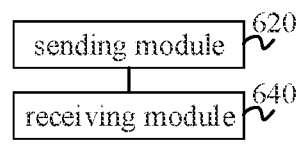
FIG. 6 is a block diagram illustrating an apparatus for radio link monitoring and recovery according to an exemplary embodiment.

FIG. 6 is a block diagram illustrating an apparatus for radio link monitoring and recovery according to an exemplary embodiment. The apparatus may be implemented in a terminal. The apparatus includes:

A sending module 620 is configured to send a random access preamble on a fallback random access chancel resource in response to a radio link failure occurring in a secondary cell.

A receiving module 640 is configured to receive a first physical downlink control channel (PDCCH) sent on a fallback control resource set (CORESET) resource. The first PDCCH is configured to schedule a data channel on a primary cell, a primary secondary cell, the secondary cell, or another secondary cell.

In an optional design of the disclosure, the secondary cell is configured to schedule the primary cell or the primary secondary cell.

In an optional design of the disclosure, the receiving module 640 is configured to monitor PDCCH on the SCell and perform RLM measurement.

In an optional design of the disclosure, the receiving module 640 is configured to receive first configuration information, in which the first configuration information is configured to configure the fallback random access channel resource, the fallback CORESET resource, and the random access preamble on the primary cell; or, the receiving module 640 is configured to receive second configuration information, in which the second configuration information is configured to configure the fallback random access channel resources, the fallback CORESET resources and the random access preamble on the primary secondary cell.

In an optional design of the disclosure, the receiving module 640 is configured to receive a second PDCCH sent on the secondary cell, in which the second PDCCH is configured to schedule the data channel on the primary cell, the primary secondary cell, the secondary cell, or the another secondary cell.

Figure 7:
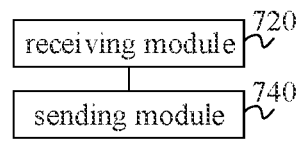
FIG. 7 is a block diagram illustrating an apparatus for radio link monitoring and recovery according to an exemplary embodiment.

FIG. 7 is a block diagram illustrating an apparatus for radio link monitoring and recovery according to an exemplary embodiment. The apparatus may be implemented in a network device. The apparatus includes:

A receiving module 720 is configured to receive a random access preamble sent by a terminal on a fallback random access chancel resource. The random access preamble is sent in response to a radio link failure occurring in a secondary cell.

A sending module 740 is configured to send a first physical downlink control channel (PDCCH) to the terminal on a fallback CORESE, resource. The first PDCCH is configured to schedule a data channel on a primary cell, a primary secondary cell, the secondary cell, or another secondary cell.

In an optional design of the disclosure, the secondary cell is configured to schedule the primary cell or the primary secondary cell.

In an optional design of the disclosure, the sending module 740 is configured to send first configuration information, in which the first configuration information is configured to configure the fallback random access channel resource, the fallback CORESET resource, and the random access preamble on the primary cell; or, the sending module 740 is configured to send second configuration information, in which the second configuration information is configured to configure the fallback random access channel resources, the fallback CORESET resources and the random access preamble on the primary secondary cell.

In an optional design of the disclosure, the sending module 740 is configured to send a second PDCCH to the terminal on the secondary cell. The second PDCCH is configured to schedule the data channel on the primary cell, the primary secondary cell, the secondary cell, or the another secondary cell.

Figure 8:
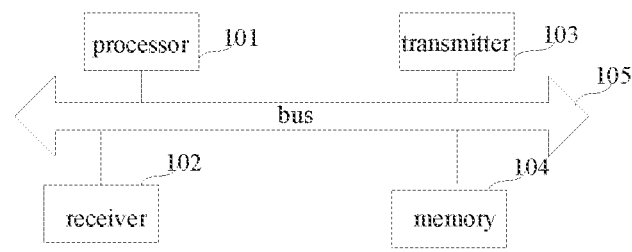
FIG. 8 is a schematic diagram illustrating a structure of a communication device according to an exemplary embodiment.

FIG. 8 is a schematic diagram illustrating a structure of a communication device (a network device or a terminal) according to an exemplary embodiment. The communication device includes a processor 101, a receiver 102, a transmitter 103, a memory 104, and a bus 105.

The processor 101 includes one or more processing cores. The processor 101 executes various functional applications and information processing by running software programs and modules.

The receiver 102 and the transmitter 103 can be implemented as a communication component, which can be a communication chip.

The memory 104 is connected to the processor 101 through the bus 105.

The memory 104 may be used to store at least one instruction, and the processor 101 may be used to execute the at least one instruction to implement the respective steps in the above method embodiment.

In addition, the memory 104 may be implemented by any type of temporary or non-temporary storage devices or their combination, such as a magnetic disk or an optical disk, an electrically erasable programmable read-only memory (EE- PROM), an electrically programmable read-only memory (EPROM), a static random access memory (SRAM), a read-only memory (ROM), a magnetic memory, a flash memory, a programmable read-only memory (PROM), etc.

In an exemplary embodiment, a computer-readable storage medium is also provided. The computer-readable storage medium stores at least one instruction, at least one program, a code set or an instruction set. The at least one instruction, the at least one program, the code set or the instruction set is loaded and executed by the processor to implement the method for radio link monitoring and recovery provided by the above method embodiments and executed by the terminal or the network device.

Those skilled in the art can understand that all or part of the steps for implementing the above embodiments can be implemented by hardware, or can be implemented by instructing relevant hardware through programs. The programs can be stored in a computer readable storage medium, which can be a read-only memory, a disk or an optical disk.

The above are only optional embodiments of the disclosure, and is not intended to limit the disclosure. Any modification, equivalent replacement, improvement, etc. made within the spirit and principles of the disclosure shall be included in the protection scope of the disclosure.

The invention claimed is:

1. A method for radio link monitoring and recovery, performed by a terminal, comprising:
    obtaining a radio link monitoring (RLM) measurement result by conducting an RLM measurement on a secondary cell, wherein the secondary cell is configured to schedule one of a primary cell or a primary secondary cell;
    sending a random access preamble on a fallback random access channel resource in response to the RLM measurement result being that a radio link failure occurs in the secondary cell; and
    receiving a first physical downlink control channel (PDCCH) sent on a fallback control resource set (CORESET) resource, wherein the first PDCCH is configured to schedule a data channel on one of the primary cell, the primary secondary cell, the secondary cell, or another secondary cell,
    wherein the fallback random access channel resource, the fallback CORESET resource and the random access preamble are:
    resources on the primary cell, or
    resources on the primary secondary cell.

2. The method of claim 1, further comprising one of:
    receiving first configuration information, wherein the first configuration information is configured to configure the fallback random access channel resource, the fallback CORESET resource, and the random access preamble on the primary cell; or
    receiving second configuration information, wherein the second configuration information is configured to configure the fallback random access channel resource, the fallback CORESET resource and the random access preamble on the primary secondary cell.

3. The method of claim 1, further comprising:
    receiving a second PDCCH sent on the secondary cell, wherein the second PDCCH is configured to schedule the data channel on the one of the primary cell, the primary secondary cell, the secondary cell, or the another secondary cell.

4. A non-transitory computer readable storage medium having executable instructions stored thereon, wherein the executable instructions are loaded and executed by a processor to implement the method of claim 1.

5. The method of claim 1, further comprising:
    monitoring a PDCCH on the secondary cell and performing radio link monitoring (RLM) measurement.

6. A method for radio link monitoring and recovery, performed by a network device, comprising:
    receiving a random access preamble sent by a terminal on a fallback random access channel resource, wherein the random access preamble is sent in response to a radio link monitoring (RLM) measurement being that a radio link failure occurs in a secondary cell, wherein the RLM measurement result is obtained by conducting an RLM measurement on the secondary cell, wherein the secondary cell is configured to schedule one of a primary cell or a primary secondary cell; and
    sending a first physical downlink control channel (PDCCH) to the terminal on a fallback control resource set (CORESET) resource, wherein the first PDCCH is configured to schedule a data channel on one of the primary cell, the primary secondary cell, the secondary cell, or another secondary cell,
    wherein the fallback random access channel resource, the fallback CORESET resource and the random access preamble are:
    resources on the primary cell, or
    resources on the primary secondary cell.

7. The method of claim 6, further comprising one of:
    sending first configuration information, wherein the first configuration information is configured to configure the fallback random access channel resource, the fallback CORESET resource, and the random access preamble on the primary cell; or
    sending second configuration information, wherein the second configuration information is configured to configure the fallback random access channel resource, the fallback CORESET resource and the random access preamble on the primary secondary cell.

8. The method of claim 6, further comprising:
    sending a second PDCCH to the terminal on the secondary cell, wherein the second PDCCH is configured to schedule the data channel on the one of the primary cell, the primary secondary cell, the secondary cell, or the another secondary cell.

9. A terminal, comprising:
    a processor;
    a transceiver connected with the processor; and
    a memory for storing executable instructions of the processor;
    wherein the processor is configured to:
    obtain a radio link monitoring (RLM) measurement result by conducting an RLM measurement on a secondary cell, wherein the secondary cell is configured to schedule one of a primary cell or a primary secondary cell;
    send a random access preamble on a fallback random access channel resource in response to the RLM measurement result being that a radio link failure occurs in the secondary cell; and
    receive a first physical downlink control channel (PDCCH) sent on a fallback control resource set (CORESET) resource, wherein the first PDCCH is configured to schedule a data channel on one of the primary cell, the primary secondary cell, the secondary cell, or another secondary cell,
    wherein the fallback random access channel resource, the fallback CORESET resource and the random access preamble are:
    resources on the primary cell, or
    resources on the primary secondary cell.

10. The terminal of claim 9, wherein the secondary cell is configured to schedule one of the primary cell or the primary secondary cell.

11. The terminal of claim 9, wherein the processor is further configured to:
   monitor a PDCCH on the secondary cell and perform radio link monitoring (RLM) measurement.

12. The terminal of claim 9, wherein the processor is further configured to perform one of:
   receiving first configuration information, wherein the first configuration information is configured to configure the fallback random access channel resource, the fallback CORESET resource, and the random access preamble on the primary cell; or
   receiving second configuration information, wherein the second configuration information is configured to configure the fallback random access channel resource, the fallback CORESET resources and the random access preamble on the primary secondary cell.

13. The terminal of claim 9, wherein the processor is further configured to:
   receive a second PDCCH sent on the secondary cell, wherein the second PDCCH is configured to schedule the data channel on the one of the primary cell, the primary secondary cell, the secondary cell, or the another secondary cell.

14. A network device, comprising:
   a processor;
   a transceiver connected with the processor; and
   a memory for storing executable instructions of the processor;
   wherein the processor is configured to load and execute the executable instructions to implement the method of claim 6.

15. A non-transitory computer readable storage medium having executable instructions stored thereon, wherein the executable instructions are loaded and executed by a processor to implement the method of claim 6.

* * * * *